United States Patent Office 2,849,882
Patented Sept. 2, 1958

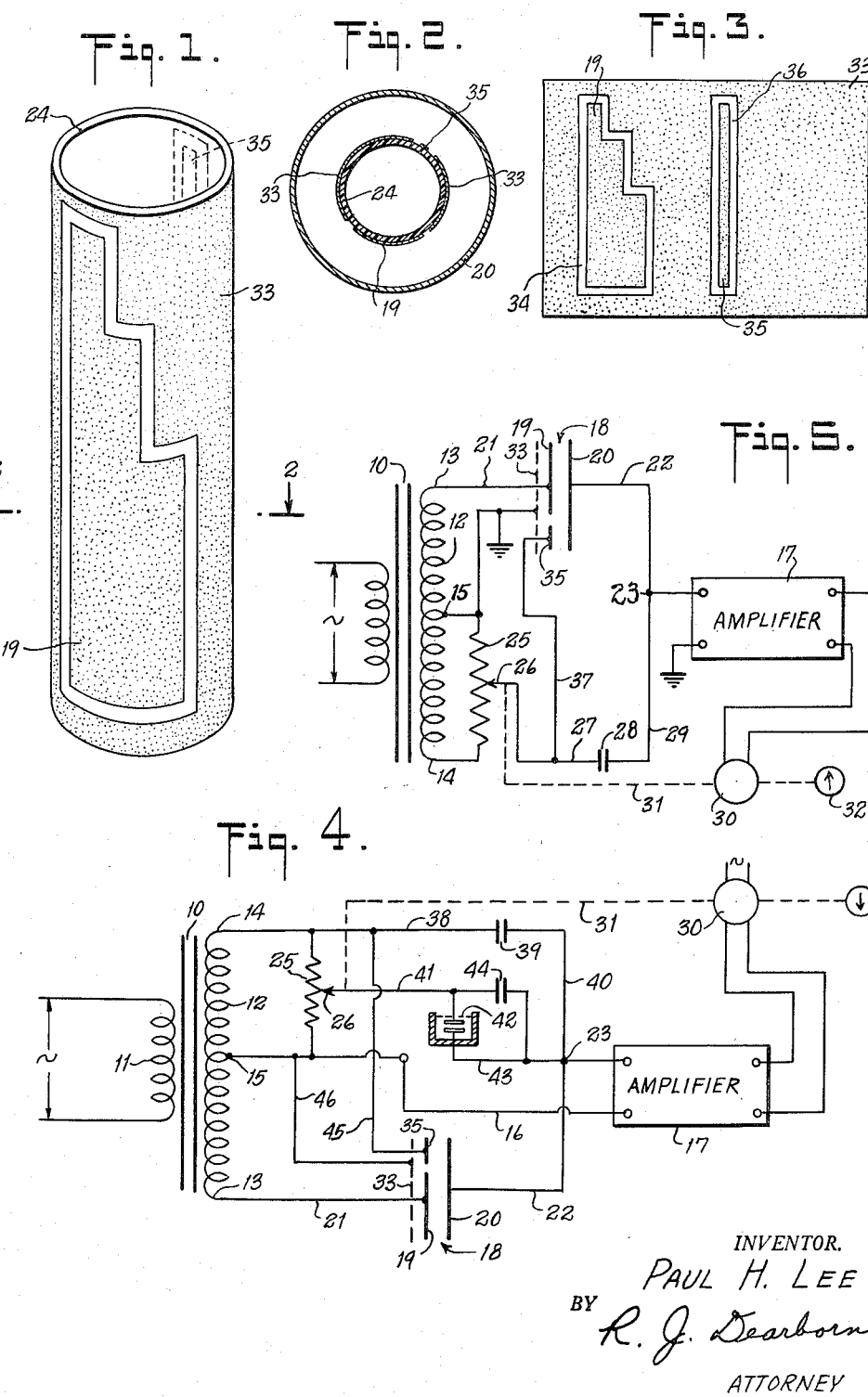

2,849,882

CAPACITANCE-TYPE LIQUID QUANTITY MEASURING SYSTEM WITH COMPENSATION FOR ELECTRICAL LEAKAGE

Paul H. Lee, Norwalk, Conn., assignor to The Liquidometer Corporation, Long Island City, N. Y., a corporation of Delaware Application December 4, 1956, Serial No. 626,121

6 Claims. (Cl. 73—304)

The present invention relates to a capacitance-type, liquid quantity measuring system with compensation for electrical leakage. Particularly the present invention has to do with capacitance-type means for measuring the amount of fluent material or liquid in a container, wherein there is a measuring capacitor disposed in the container so that the fluent material being measured will exist between the plates of the capacitor to an extent dependent upon the quantity of such fluent material in the container. As such, the capacitance of the measuring capacitor will be a function of the quantity and more particularly the height of the fluent material in the container and also of the dielectric constant of this fluent material.

It has been proposed to form one plate or electrode of such a measuring capacitor as a tubular body of non-conductive organic plastic material having an area covered with a conductive material, usually on the outside of the plastic tube. In this way, it is possible to so shape the conductive area of the plastic tube as to compensate for different shapes or configurations of containers with which the measuring capacitor may be used. This is quite important, particularly in measuring the amount of liquid, such as a liquid fuel in a tank in an airplane, as it has been found necessary to form such tanks of a considerable number of different sizes and shapes so that these tanks may be fitted into available spaces in the wings and/or fuselage of a plane. Because of the different shapes of the tanks and a desire for relative uniformity in indication, it has been found desirable to provide a capacitor plate of such shape, in accordance with the shape of the tank with which the capacitor is to be associated, that the capacitance change per unit quantity change in the amount of liquid or other fluent material being measured will be substantially constant. The present invention contemplates the use of specially shaped conductive bodies for this general purpose.

In practice, it has been found convenient to form such specially shaped conductive bodies as metallized patches or areas on the outside of a tube of non-conductive organic plastic material. It is recognized that such metallized areas could also be formed, if desired, on the inside of such plastic tubes, but this is usually less convenient. In the ordinary case the other electrode will be a conventional metal tube, such as an aluminum tube, which will be arranged concentrically around the metallized plastic tube as aforesaid with provisions for the free entry and exit of the fluent material being measured to and from the space between these tubes.

It has also been conventional to cover most of the remaining area of the outside of such a plastic tube with a conductive coating or cover, such as a metallized coating, and to connect such other area to a base potential for the system, usually ground. When this is done, there will be a certain amount of the electrical leakage between the first named metallized area constituting one principal electrode of the capacitor and the remaining metallized area (ground), possibly due to slight conductivity in the fluent material being measured or to other causes.

It has been found, for example, that such electrical leakage usually increases when the device is operated under conditions of relatively high humidity. When this occurs, it is likely to cause substantial errors in the indications given by the system. Due to the fact that such errors may in some instances at least be traced to operation under conditions of high humidity and as it is important that systems of this kind, particularly for use in measuring the fuel in aircraft fuel tanks, shall be operable without undue error even under conditions of high humidity, it has been the practice of those writing specifications for such systems for use in military aircraft to require and accept not more than a predetermined and stated maximum of tolerable error due to conditions of humidity. It is to assist in overcoming difficulties of that kind and, for example, in meeting specifications of governmental agencies for military aircraft that the present invention is particularly designed.

However, irrespective of the cause of the electrical leakage and the particular amount thereof in a given installation, the present invention provides a means for automatically offsetting the effect of such leakage on the ultimate indication of fluid quantity.

Summarizing the present invention, therefore, there is provided in accordance therewith a second area covered with a conductive material, which is coextensive in vertical height with the first predetermined area where such first area is used as one principal electrode of the measuring capacitor, and wherein the second such area is similarly separated from the grounded portion of the coating of the plastic tube by a space substantially equal to the space between the first area and the grounded portion. The coating of this second predetermined area may then be electrically connected to a source of potential which is instantaneously opposed to the potential supplied to the measuring capacitor and particularly to the first area constituting a principal electrode thereof.

The above principles may be applied in a number of different measuring circuits, as long as there is provision in such circuits for instantaneously opposing potentials such as are commonly present in balanceable circuits which have now come into widespread use in conjunction with capacitance type, liquid quantity measuring systems.

By resorting to the expedients hereinabove outlined there will be substantially equal and opposite effects due to electrical leakage, so that whether the leakage be through the fluent material or above it and irrespective of the causes of the leakage, such as humidity conditions, the effects thereof will be to a large and practical extent eliminated from affecting the ultimate indication afforded by the system. As such, the present invention may be embodied in some of the older systems wherein no compensation is attempted for variations in the dielectric constant of the liquid. Alternatively, the present invention may be embodied in a more modern and more accurate system for indicating the volume of fluent material being measured in an accurate manner and/or for indicating the weight of such material by the use of principles which are now generally employed, namely by so proportioning the values of certain of the circuit components, both as to their absolute values and their relative values, that advantage can be taken of a practical empirical relationship (within an operating range) between dielectric constant and density. Thus the system as a whole, which includes a measuring capacitor as aforesaid and a totally submerged compensating capacitor sensitive only to the dielectric constant of the fluid, may be used in a particular way to control an indicator which may be graduated in terms of fuel weight and which will be accurate within tolerable limits.

Other and more detailed objects and features of the present invention will become apparent from a consideration of the following specification and in conjunction with the accompanying drawings, in which:

Figure 1 is a perspective view of a plastic tube having areas covered with conductive material in accordance with the present invention;

Fig. 2 is a view substantially in horizontal section on the line 2—2 of Fig. 1 as to the structure shown in that figure and further illustrating an outer electrode which is not shown in Fig. 1;

Fig. 3 is a developed view of the outside of the tube shown in Fig. 1;

Fig. 4 is a circuit diagram illustrating the modification of a known type of circuit to embody the present invention, this circuit being one usable for indicating liquid weight; and Fig. 5 is a view similar to Fig. 4 showing another and simpler type of circuit to which the present invention is applied.

Referring first to Figs. 4 and 5, there is shown in each of these figures a transformer 10 having a primary winding 11 which is adapted to be energized by any suitable source of alternating potential. The secondary winding 12 of the transformer 10 provides at one end a first voltage source 13 and at the other end as shown a second voltage source 14, which will be of substantially the opposite phase or instantaneous potential from the voltage source 13 with respect to a central portion of the winding 12, this center portion or point being connected to a point of base potential (as ground) 15. In the embodiment shown in Fig. 4, the center point 15 of the winding 12 is not shown as connected to ground as such; but this point is connected through a conductor 16 to one of the input terminals of an amplifier 17, which serves as the potential responsive means for the electrical network. Thus the conductor 16 is at base potential for the network and in effect is a means serving the same purpose as the ground connection shown in Fig. 5. Similarly, in Fig. 5 one input terminal of the amplifier 17 is shown connected to ground.

In each form of the invention there is provided a measuring capacitor generally indicated at 18 and including the principal electrode 19 which may be the metal coating of the first predetermined area as shown in Figs. 1 to 3, this area being shown as irregular in shape to compensate for a correspondingly irregularly shaped container with which the capacitor may be assumed to be associated in use. The other principal electrode of the measuring capacitor 18 may be constituted by an ordinary metal tube 20 surrounding and spaced from the tube carrying the electrode 19. As shown, the principal electrode 19 is connected to the first voltage source 13 by a conductor 21. The other principal electrode comprising tube 20 of the measuring capacitor 18 is connected by a conductor 22 to a circuit output terminal 23, which in turn is connected to one of the input terminals of the amplifier 17.

In accordance with the present invention and referring now to Figs. 1 to 3, inclusive, one electrode of the capacitor 18 is preferably specially constructed in this instance by forming this electrode as a conductive coating on the outside of a non-conducting organic plastic tubular body 24. This conductive area or principal electrode 19 may be made by a metallizing operation in a manner which per se forms no part of the present invention and which hence will not be particularly described herein.

Turning now to Fig. 5 only, the lower portion of the transformer secondary 12 has connected thereacross a potentiometer resistance 25 as shown and cooperating with this resistance is an adjustable tap 26. The tap 26 is connected by a conductor 27 to one of the plates of a balancing capacitor 28, the other plate of which is connected by a conductor 29 to the circuit output terminal 23. The circuit output terminals i. e., the terminal 23 and ground serve as the input of the amplifier 17, which acts as a potential responsive means and acts to control the operation of a balancing servo-motor 30 which may be mechanically connected by a suitable means indicated by the broken line 31 to the variable tap 26 on the potentiometer resistance 25 so as to balance the circuit to a condition such that the potential between the output terminals thereof is reduced substantially to zero. The motor 30 is also connected mechanically to an indicator 32 so that the indicator will be moved to indicate a value proportional to the position of the adjustable tap 26 on the potentiometer resistance 25. The circuit shown in Fig. 5 and thus far particularly described is conventional and has been fully disclosed in the prior art.

In accordance with the present invention, and pursuant to a practice which has grown up in this art in the making of capacitor devices particularly for use in fuel tanks of airplanes, a major part of the area of the outer surface of the tubular body 24 is covered with a conductive coating as indicated at 33, the coating 33 being spaced from the conductive coating forming the electrode 19 by a space 34 of substantially uniform width. It is across this space 34 that there is some electrical leakage, an undesired condition which apparently is made worse by the use of the device under conditions of high humidity, so that it is the object of the present invention to provide compensating means for this electrical leakage irrespective of the amount and the cause thereof.

In accordance with the present invention, there is provided a second predetermined area covered by a conductive coating 35 which is similarly spaced from the area 33 by a space 36 of substantially the same width as the space 34. Furthermore, the conductive coating 35 is substantially coextensive in a vertical direction with the coated area forming the principal electrode 19, so as to be immersed in the liquid being measured to the same extent as the conductive area of electrode 19 and so that the electrical leakage across the space 36 will be substantially the same as the electrical leakage across the space 34 under all conditions of use. If then the conductive area 35 is connected by a conductor 37 to the conductor 27 as shown in Fig. 5, the electrical leakage between the second voltage source which is of opposite phase from that of electrode 19 and thus which is instantaneously opposing the voltage at the first voltage source in this embodiment of the invention, will result in equal and opposite effects upon the potential at the circuit output point 23 with respect to the circuit output point constituted by the ground connection at point 15 in the Fig. 5 form of the invention. This will in effect cancel the undesired results of electrical leakage, irrespective of the source or amount thereof and irrespective of whether this leakage is due to conduction through the fluid being measured and/or to humidity conditions in the space above the surface of the fluid being measured.

Turning now to the form of the invention in Fig. 4, it is noted that the same reference characters have been used as far as they are applicable generically to the circuits of Figs. 4 and 5. In Fig. 4, however, the second source of voltage in a fixed voltage source and is constituted by the upper end 14 of the transformer secondary 12, which is connected by a conductor 38 to a fixed value condenser 39 and thence through a conductor 40 to the circuit output point 23. In practice, the condenser 39 is of such value in proportion to the voltages at the points 13 and 14 that the product of the voltage at the point 14 times the capacitance of the condenser 39 is substantially equal to the product of the voltage at the point 13 times the capacitance of the measuring capacitor 18 when the container is free of liquid or fluid to be measured. In other words, the condenser 39 may be termed an empty tank compensation capacitor.

As in the form of the invention shown in Fig. 5, a potentiometer resistance 25 is connected between the center tap point 15 of the secondary winding 12 and the point 14. An adjustable tap 26 on this potentiometer resistance is connected by a conductor 41 to one plate of an immersed condenser 42, the other plate of which is connected by a conductor 43 to the circuit output point 23. In operation, the plates of the condenser 42 are arranged so as to always be wholly immersed in the liquid being measured. Thus, the capacitance of the condenser 42 will vary solely as a function of the dielectric constant of the liquid. There is also provided a capacitor 44 which is connected in parallel with the capacitor 42 to the conductors 41 and 43.

In order that the system as shown in Fig. 4 may be capable of measuring the quantity of liquid in a tank in terms of weight, rather than merely in terms of volume, it is necessary that there be a particular relationship between the values of the immersed condenser 42 (when free of the liquid being measured) and the capacitor 44, which is a fixed value capacitor. These relative values are such that the ratio of the capacitance of the capacitor 42 (when empty) is to the value of the capacitance of the capacitor 44 as 1 is to 3 (approximately). The particular ratio of these values may be worked out in detail in accordance with the specific teachings found in the application of Sontheimer et al. Serial No. 177,574, filed August 4, 1950, for "Fluid Quantity Measuring System."

The circuit of Fig. 4 is substantially the same as this Sontheimer et al. case teaching with the exception that the measuring capacitor 18 is provided with an extra conductive coating 35 as aforesaid which, as shown in Fig. 4, is connected by a conductor 45 to the conductor 38 and also through this conductor to the point 14. Thus, in this embodiment of the invention also, the effect of electrical leakage is neutralized by making the leakage from the electrode 19 to the conductive coating 33 (Figs. 1 to 3) substantially the same as the electrical leakage from the conductive coating 35 to the conductive coating 33. It will be understood that in the form of the invention in Fig. 4, the conductive coating 33 (shown as a broken line in this figure) will be electrically connected as by conductor 46 either to the point 15 or to the conductor 16, depending on convenience of connection as this point and this conductor are at the base potential for the system. The function of the system in the form of Fig. 4 is essentially similar to that of Fig. 5 insofar as the present particular invention is concerned.

While there is herein shown and described but two circuit embodiments of the invention and the particular physical embodiment of a capacitor construction embodying this invention has been shown in Figs. 1 to 3, it will be understood that further alternatives will suggest themselves to those skilled in the art from the foregoing disclosure. The present invention should therefore be measured by the appended claims, which are to be construed validly as broadly as the state of the prior art permits.

What is claimed is:

1. A capacitance-type measuring system for measuring the quantity of a fluent material in a container, comprising a measuring capacitor adapted to be disposed in the container so as to be immersed in the fluent material therein to an extent dependent upon the quantity of such fluent material in the container, so that its capacitance shall be a function of the quantity of the fluent material to be measured, said measuring capacitor including one electrode means which includes a support, a first predetermined area on said support covered with conductive material which extends over the vertical height of the fluent material to be measured and serves as a principal electrode of said capacitor, a second predetermined area on said support covered with conductive material which is substantially coextensive vertically with said first area and which serves as a compensating electrode, and conductive material substantially covering the remainder of the area of said support and approaching but separated from said first and second predetermined areas by spaces of substantially equal and uniform width and serving as a zone at the base potential for the system for the equalization of electrical leakage; a second principal electrode for said measuring capacitor which is separated from the first named principal electrode by a space which is adapted to be occupied by said fluent material when said container is filled; a balanceable network including said measuring capacitor, a source of alternating voltage of one phase connected to one of the principal electrodes of said measuring capacitor, the other of said principal electrodes being connected to a circuit output terminal, a second source of alternating voltage connected to said first source but substantially of opposite phase therefrom, a balancing capacitor connected between said second source and said circuit output terminal, a second output terminal for said network which is at the base potential for the system and which is connected to both said sources of alternating voltage and is also connected directly to said conductive material substantially covering the remainder of said area of said support, an electrical connection from the conductive material covering said second predetermined area to said second source of voltage, potential responsive means connected to said output terminals, an indicator, and means controlled by said potential responsive means for rebalancing said network, so as to reduce the potential between said output terminals substantially to zero and for controlling the setting of said indicator.

2. A capacitance-type measuring system in accordance with claim 1, in which the base potential for the system is ground.

3. A capacitance-type measuring system in accordance with claim 1, in which said first predetermined area is shaped in accordance with the configuration of the container with which the system is associated, so as to provide a substantially constant capacitance change for said measuring capacitor per unit of change of the fluid contents of the container which are being measured.

4. A capacitance-type measuring system in accordance with claim 1, in which said electrode means is a tube of non-conductive organic plastic material, and in which the conductive material covering various areas of this tube as aforesaid are metallized areas on the outer surface of said tube of plastic material.

5. A capacitance-type measuring system for measuring the quantity of a fluent material in a container, comprising a measuring capacitor adapted to be disposed in the container so as to be immersed in the fluent material therein to an extent dependent upon the quantity of such fluent material in the container, so that its capacitance shall be a function of the quantity of the fluent material to be measured and of the dielectric constant of said fluent material, said measuring capacitor including one electrode means which includes a support, a first predetermined area on said support covered with conductive material which extends over the vertical height of the fluent material to be measured and serves as a principal electrode of said capacitor, a second predetermined area on said support covered with conductive material which is substantially coextensive vertically with said first area and which serves as a compensating electrode, and conductive material substantially covering the remainder of the area of said support and approaching but separated from said first and second predetermined areas by spaces of substantially equal and uniform width and serving as a zone at the base potential for the system for the equalization of electrical leakage; a second principal electrode for said measuring capacitor which is separated from the first named principal electrode by a space which is adapted to be occupied by said fluent material when said container is filled; a balanceable network including said measuring capacitor, a source of alternating voltage of one phase connected to one of the principal electrodes of said measuring capacitor, the other of said principal electrodes being connected to a circuit output terminal, a second source of alternating voltage of fixed value connected to said first source but substantially of opposite phase therefrom, a capacitor connected between said second source and said circuit output terminal and serving to provide to said circuit output terminal a current which will balance the current through said measuring capacitor when said container is empty of fluent material, a second output terminal for said network which is at the base potential for said system and which is connected to both said sources of alternating voltage, means connecting said conductive material substantially covering the remainder of the area of said support to said second output terminal for said network, an electrical connection from the conductive material covering said second predetermined area to said second source of voltage, a third variable source of alternating voltage which is connected to said first and second sources and to said second output terminal and which is in phase with said second source, a condenser adapted to be wholly immersed in said fluent material in the container during the use of the measuring system, so that its capacity will vary as a function solely of the dielectric constant of said fluent material, means connecting said immersed condenser between said third variable source of voltage and the first named output terminal for the system, potential responsive means connected to said output terminals, an indicator, and means controlled by said potential responsive means for rebalancing said network by varying the potential of said third source of voltage, so as to to reduce the potential between said output terminals substantially to zero and for controlling the setting of said indicator.

6. A capacitance-type measuring system in accordance with claim 5, comprising in addition, a fixed value condenser connected in parallel with said immersed condenser between said third variable source of voltage and the first named output terminal for said network, the relative values for said immersed capacitor and the fixed value capacitor which is connected in parallel therewith and the other capacitors being such that the said indicator may be calibrated in terms of liquid weight with a tolerable minimum of error in the indication of the quantity of liquid in terms of weight.

References Cited in the file of this patent

UNITED STATES PATENTS

| | | |
|---|---|---|
| 2,582,399 | Smith | Jan. 15, 1952 |
| 2,699,523 | Meyers | Jan. 11, 1955 |
| 2,738,673 | Campani | Mar. 20, 1956 |
| 2,741,124 | Meyers | Apr. 10, 1956 |
| 2,789,435 | Weiss | Apr. 23, 1957 |